(12) United States Patent
Udupi et al.

(10) Patent No.: US 9,094,377 B2
(45) Date of Patent: Jul. 28, 2015

(54) KEY GENERATION AND BROADCASTING

(71) Applicant: Netflix, Inc., Los Gatos, CA (US)

(72) Inventors: Poornaprajna Udupi, San Jose, CA (US); Jason Chan, Los Gatos, CA (US); Jay Zarfoss, Los Gatos, CA (US)

(73) Assignee: NETFLIX, INC., Los Gatos, CA (US)

( * ) Notice: Subject to any disclaimer, the term of this patent is extended or adjusted under 35 U.S.C. 154(b) by 46 days.

(21) Appl. No.: 13/969,365

(22) Filed: Aug. 16, 2013

(65) Prior Publication Data

US 2015/0052358 A1 Feb. 19, 2015

(51) Int. Cl.
*H04L 29/06* (2006.01)
(52) U.S. Cl.
CPC ............ *H04L 63/0435* (2013.01); *H04L 63/08* (2013.01); *H04L 63/0428* (2013.01); *H04L 63/062* (2013.01)
(58) Field of Classification Search
CPC ... H04L 63/08; H04L 63/0428; H04L 63/062; H04L 63/0435
USPC .......................................................... 713/171
See application file for complete search history.

(56) References Cited

U.S. PATENT DOCUMENTS

| 5,557,765 | A  | * | 9/1996 | Lipner et al. | 380/286 |
| 6,118,874 | A  | * | 9/2000 | Okamoto et al. | 380/282 |
| 2001/0011250 | A1 | * | 8/2001 | Paltenghe et al. | 705/41 |
| 2003/0012386 | A1 | * | 1/2003 | Kim et al. | 380/286 |
| 2010/0142713 | A1 | * | 6/2010 | Perlman | 380/286 |
| 2012/0131350 | A1 | * | 5/2012 | Atherton | 713/186 |

* cited by examiner

*Primary Examiner* — Michael S McNally
(74) *Attorney, Agent, or Firm* — Artegis Law Group, LLP

(57) ABSTRACT

Embodiments provide techniques generating and managing encryption keys within a computing infrastructure. Embodiments provide a key publisher that generates and maintains key pairs in a list at a configurable interval. In addition, the key publisher publishes the list to other components within the computing infrastructure. Embodiments also provide a key consumer that downloads the list of encrypted key pairs and maintains an active window of keys to can be accepted from client devices that communicate sensitive data to the computing infrastructure. If the key consumer receives a key from a client device that is outside of the active window yet that corresponds to a future key pair in the list, the key consumer advances the active window towards the future key pair.

20 Claims, 7 Drawing Sheets

KEY GENERATION AND BROADCASTING

BACKGROUND

1. Technical Field

The present disclosure relates generally to computer security. More specifically, techniques are disclosed for key management in a distributed environment.

2. Description of Related Art

Computer security in a cloud environment is a well-known issue in a broad variety of contexts. For example, companies engaging in online commerce are generally subject to data security standards in regard to handling sensitive data of clients of the service. For instance, under the Payment Card Industry (PCI) data standard, a company that accepts credit cards as payment is required to comply with a number of regulations related to handling data, such as credit card information and customer information. Generally, to comply with such regulations, a company uses encryption techniques to protect sensitive data moving across the compliance chain handling payment transactions to and from the cloud.

Typically, to provide security for sensitive data, a company segments the sensitive data and applications accessing the sensitive data into a high security environment. In general computer security terms, this approach is referred to as compartmentalization. While the rest of the computing infrastructure of the company may have security controls adequate for business purposes, the high security environment generally has a higher level of security that include firewalling, detailed audit logs, periodic third-party security assessments for standards compliance (e.g., with PCI, HIPAA, etc.). These computing systems within the high security environment are considered "in-scope" and require compliance with the standards. However, maintaining the high security environment takes time, effort, and expense. That is, the more components included within the high security environment, the more costly and less agile the infrastructure becomes. This is particularly a concern in the cloud environment, where the state of the entire network frequently changes (e.g., with new storage and network elements being introduced, older elements being removed, etc.). This makes it difficult to both enforce security and maintain the agility afforded by cloud services.

SUMMARY

One embodiment presented herein includes a method for managing encrypted key pairs. The method generally includes generating a set of encrypted key pairs and designating, from the set of encrypted key pairs, a first encrypted key pair as a currently active key pair. The method also generally includes designating a time-based window having a size and indicating a number of key pairs that are valid for transactions. The method also generally includes publishing the public key corresponding to the currently active key pair to a key distributor and publishing the set of encrypted key pairs to a key escrow.

Another embodiment includes a method for managing encrypted data. The method generally includes receiving an encrypted message having metadata corresponding to a public key. The method also generally includes identifying a first key pair corresponding to the public key in a set of key pairs. A second key pair in the set is a currently active key pair. The set of key pairs includes a window having a size and indicating a number of key pairs that are valid for transactions. One of the number of key pairs is the currently active key. Upon determining that the identified first key pair is within the window, a decryption key from the key pair is accessed and the message is decrypted.

Other embodiments include, without limitation, a computer-readable medium that includes instructions that enable a processing unit to implement one or more aspects of the disclosed methods as well as a system configured to implement one or more aspects of the disclosed methods.

BRIEF DESCRIPTION OF THE DRAWINGS

So that the manner in which the above recited features of the disclosure can be understood in detail, a more particular description, briefly summarized above, may be had by reference to embodiments, some of which are illustrated in the appended drawings. It is to be noted, however, that the appended drawings illustrate only typical embodiments of the present disclosure and are therefore not to be considered limiting of its scope, for the disclosure may admit to other equally effective embodiments.

DETAILED DESCRIPTION

Figure 1:
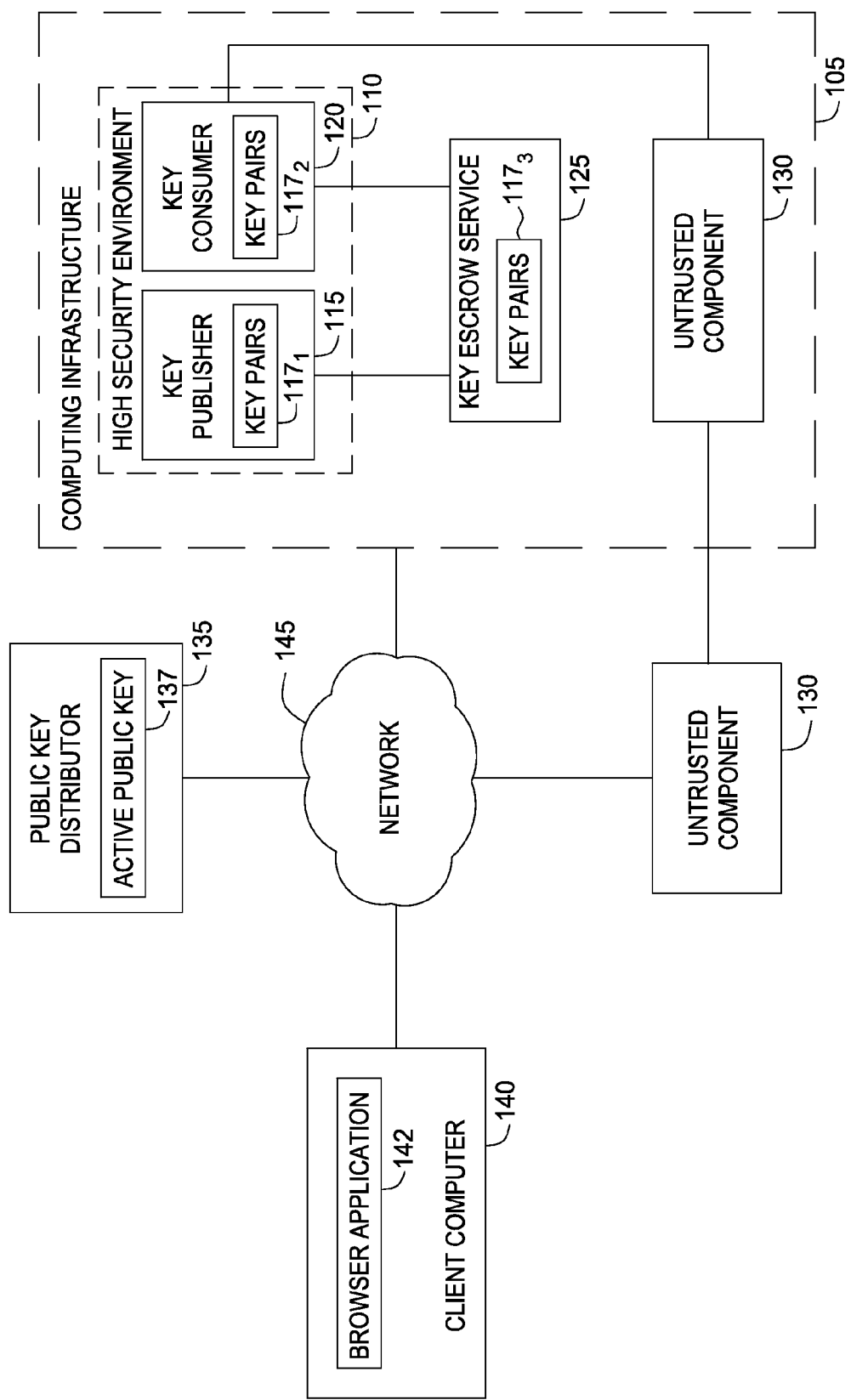
FIG. 1 illustrates an example computing environment, according to one embodiment.

Companies apply various approaches to provide security for sensitive data and comply with regulatory standards and minimizing costs. For example, with a static public key approach, each client that needs to send sensitive data downloads a public key from the receiving entity once. Any communication between the client and the receiving entity is encrypted with the public key. However, although this approach does not require many resources within the high security environment, the computing infrastructure is susceptible to data theft if the key is compromised (e.g., if an attacker intercepts and stores historically transacted data). To address this concern, an administrator can issue new keys and revoke the validity of older keys, but doing so may require system downtime while the administrator broadcasts the new keys to systems in the compliance chain. Taking down a system component to update key data may be impractical for companies whose services need to be running at all times. Further, other approaches such as tokenization and using per-transaction symmetric keys often depend on a single point of failure. If a component goes offline, the high security environment may be unable to operate. At that point, an administrator can only either shut the entire system down or continue to operate in an unsecure manner. Both options are also undesirable for companies that need to maintain constantly running services.

Embodiments presented herein provide techniques for managing encrypted public keys in a distributed environment.

More specifically, embodiments presented herein provide an automated multiple-key-pair sliding window architecture. In one embodiment, a key publisher in a high security environment generates a list of encrypted key pairs and designates one pair as an active key pair. The key publisher publishes the list to a key escrow service and sends the public key corresponding to the active key pair to a public key distributor. The distributor may be a module that resides outside of the high security environment. The public key distributor provides the active public key to client systems. At a specified interval, the key publisher generates additional keys to append to the encrypted key pair list, designates a new active key pair, and republishes appropriate information to the public key distributor and key escrow. The key publisher may also remove older key pairs from the list.

In one embodiment, a key consumer (i.e., an application residing in the high security environment that processes sensitive client-side data) downloads the encrypted key pair list from the key escrow service. The key consumer maintains an active window within the list of key pairs that the key consumer can accept from client systems communicating sensitive data to the computing infrastructure. That is, the key consumer identifies which public keys can be used to provide encrypted data to the key consumer. The key consumer maintains a copy of the private keys corresponding to the ones in the active window. The active window identifies the currently active key pair as well as a specified maximum number of previous encrypted key pairs. When the key consumer receives a secure message from a client device, the key consumer accesses metadata associated with the message and identifies the version of the pair from the list used to decrypt the message. If the identified key pair does not correspond to one within the active window but is sequentially later in the list (i.e., corresponds to a future key), the key consumer decrypts the message as well as advances the window so that the active key of the window corresponds to the future key. Otherwise, if the corresponding key is not within the active window, no decryption occurs. That is, the window may have advanced past a time where the key was valid. In such a case, the key consumer may abort the operation.

In the following description, numerous specific details are set forth to provide a more thorough understanding of the embodiments. However, it will be apparent to one of skill in the art embodiments of the present disclosure may be practiced without one or more of these specific details. In other instances, well-known features have not been described in order to avoid obscuring the embodiments.

FIG. 1 illustrates an example computing environment 100, according to one embodiment. As shown, FIG. 1 includes a computing infrastructure 105 connected to a network 145. Computing infrastructure 105 may belong to any entity that processes sensitive data to or from one or more client computers 140. For example, computing infrastructure 105 may correspond to an enterprise that processes credit cards as payment from customers and, as a result, has system components in place to comply with PCI standards. Note that in the following, a key sliding window approach that allows a company to comply within PCI standards is used as a reference example to provide an understanding of the embodiments described herein. However, it will be apparent to one of skill in the art that these embodiments are applicable for other compliance standards and security requirements related to key generation and broadcasting. For example, computing infrastructure 105 may correspond to a hospital that allows client computers 140 to access patient records (e.g., through a browser application 142) while maintaining compliance with HIPAA (Health Insurance Portability and Accountability Act) standards.

Computing infrastructure 105 includes a high security environment 110 and a key escrow service 125. Generally, components residing in high security environment 110 are considered "in-scope" with regards to compliance because the components process sensitive data. For example, the components should comply with PCI standards. Computing infrastructure may also include one or more untrusted components 130 that transmits or has access to encrypted data communicated within computing infrastructure 105, despite not being a part of high security environment 110. Typically, by only being able to access encrypted data (and unable to decrypt such data), such systems are "out of scope" for purposes of the PCI standards. That is, a system can receive and pass encrypted information without becoming "in-scope." In one embodiment, computing infrastructure 105 is a cloud computing network. For instance, a company may want to deploy high security on a cloud infrastructure, regardless of whether the company actually hosts the cloud components. However, in such an environment, virtual machines may be launched to execute (within the cloud network) systems, storage, etc. This presents a challenge in maintaining compliance while keeping data hosted by the cloud secure (e.g., keeping a key in sync with different key consumer services that migrate across multiple hosts).

To address such challenges, embodiments presented herein provide key generation and broadcasting techniques using a sliding window approach. In one embodiment, a high security environment 110 includes system components that handle sensitive data. Illustratively, high security environment 110 includes a key publisher 115 and key consumers 120. Key publisher 115 generates and maintains a list of encrypted key pairs $117_1$. After generating the encrypted key pairs, key publisher 115 sends the list to key escrow service 125 (shown as key pairs $117_3$). In addition, key publisher 115 designates one of the key pairs $117_1$ as an active key pair and publishes the public key corresponding to the active public key (active public key 137) to a public key distributor 135. Further, key publisher 115 purges older keys from the list of key pairs 117. Further, key publisher may run on a hardware security module (HSM) that generates and encrypts the key pairs $117_1$.

Key escrow service 125 is a highly available persistent store accessible to key publisher 115 and key consumer 120. Key escrow service 125 provides storage for the encrypted key pair list 117 and notifies key consumers 120 of new versions of the list. Although FIG. 1 depicts key escrow service 125 as residing outside high security environment 110, in another embodiment, key escrow service 125 may reside within high security environment 110.

Key consumer 120 is a system component hosting an application that accesses and processes client-side encrypted sensitive data. For example, key consumer 120 may host a billing application for an online merchant. Key consumer 120 downloads the list of encrypted key pairs $117_3$ from key escrow service 125 (shown here as key pairs $117_2$) during startup and upon receiving notification from key escrow service 125 of a changed list being available. Upon receiving a client-side encrypted message, key consumer 120 identifies metadata in the message, retrieves the appropriate version of the encrypted key pair within the list of key pairs $117_2$, and decrypts the key pair to access the decryption key. Thereafter, key consumer 120 uses the decryption key to access the sensitive information within the encrypted message. Generally, only the corresponding key consumer 120 can access cryptographic keys used to decrypt the keys from the list. That is, key publisher 115 encrypts the key or key pairs in the list of key pairs $117_1$ using different encryption keys. Note that the keys used to access the key pairs are not part of the sliding window. Key consumer 120 can accept a maximum number of previous keys preceding the active public key 137. Doing so allows key consumer 120 to handle slower clients that may have downloaded the key within a reasonable amount of time past but sends encrypted messages shortly after the key publisher has designated a new active key. Further, accepting a smaller number of previous keys limits the scope of compromise in the event an attacker is able to obtain one of the keys. That is, the size of the window is proportional to the data compromise period. For example, if the size of the window allows for ten key pairs, and the key publisher generates one key pair per day, then, in the event of a compromise, an attacker might be able to obtain at most ten days worth of data.

Computing environment 100 includes a public key distributor 135. Public key distributor 135 is a highly available component responsible for distributing active public key 137 to client computers 140 that communicate with key consumers 120 (e.g., in sending or receiving sensitive data, such as credit card information). More specifically, at specified time intervals, key publisher 115 sends the public component of one of the active public key 137 to public key distributor 135. In turn, public key distributor 135 broadcasts the public component of the active key pair to client computers 140. A browser application 142 running in a client computer 140 may receive the active encryption key from public key distributor 135 and use the key to communicate with computing infrastructure 105. For example, client computer 140 may encrypt credit card information, store the encrypted information along with metadata in a message regarding the key used to encrypt the information. The message is then transmitted to key components 120 (e.g., via untrusted components 130 over network 145). In addition, public key distributor 135 may employ a variety of several security controls such as detailed audit logs, file monitoring, configuration monitoring, third-party security assessments, and restricted and authorized access.

Computing environment 100 may also include untrusted components 130. For example, FIG. 1 depicts one untrusted component 130 outside the computing infrastructure 105 and one inside the computing infrastructure 105. A browser application 142 of a client computer 140 might send sensitive data to computing infrastructure 105 via untrusted components 130.

Figure 2:
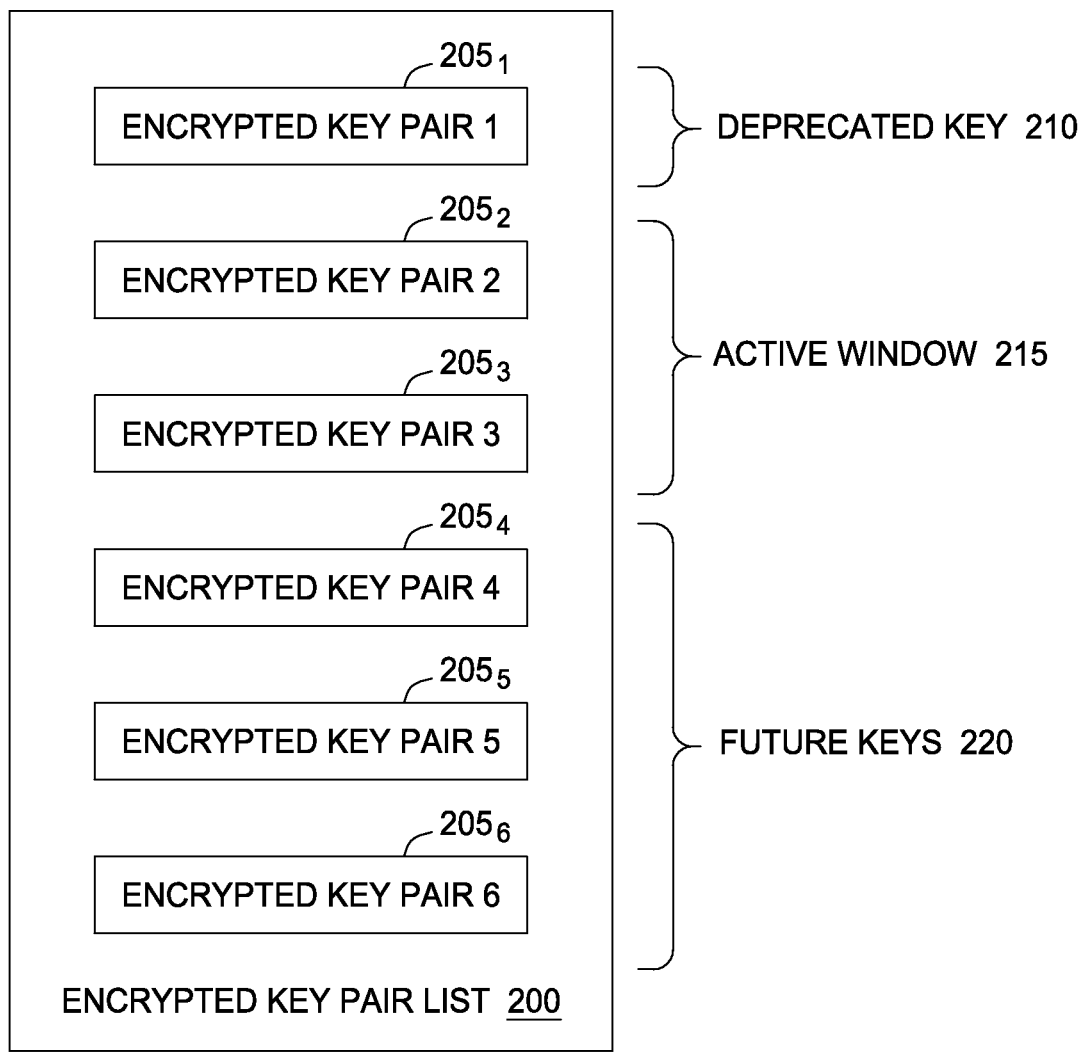
FIG. 2 illustrates a list of encrypted key pairs, according to one embodiment.

FIG. 2 illustrates an example list 200 of encrypted key pairs, according to one embodiment. At a configurable interval, the key publisher generates encrypted key pairs 205 stored in list 200. During the interval period, the key publisher also assigns a new active key pair and deprecates older key pairs. A shorter specified time interval reduces the amount of data likely to be compromised in the event that an attacker is able to compromise a key pair. In one embodiment, the key publisher is backed by an HSM that generates encrypted key pairs 205. As shown, list 200 includes multiple encrypted key pairs $205_{1-6}$.

Key consumers and other "in-scope" systems (i.e., the systems that handle sensitive data and are subject to PCI compliance standards) may access the decrypted contents of list 200. For instance, the key publisher may distribute list 200 to a key escrow within the computing infrastructure. In turn, key consumers download the list from the key escrow. As stated, key consumers are generally instantiated as part of applications that decrypt sensitive data sent by client devices. Key consumers use list 200 to decrypt the sensitive data. That is, upon receiving a client-side encrypted message, the key consumer accesses the metadata in the message envelope. Using the metadata, the key consumer accesses the corresponding encrypted key pair from list 200, decrypts the key pair to access the decryption key, and subsequently decrypts the message. As stated, the key publisher may use different keys to encrypt the key pairs. Note that the keys used to decrypt the key pairs are not part of the key window but are merely used to access the encrypted key pairs. In one embodiment, keys used to decrypt the key pair are accessible only to the appropriate key consumer within the high security environment. Further, different key consumers may have different keys for accessing the key pairs in the published list 200.

In one embodiment, the key consumer may apply a windowing key rotation to ensure that the most recent keys can be used to decrypt sensitive data and that older keys cannot be used. The right-hand portion of FIG. 2 illustrates an example windowing approach as applied to list 200 by a key consumer.

The window limits what keys a key consumer will accept as valid. For example, the key consumer may accept a maximum of number of previous keys preceding the active key pair. For example, assume that encrypted key pair 3 ($205_3$) corresponds to the current active key pair, and that the key consumer accepts up to only one key preceding the active key pair. As shown, this corresponds to active window 215, which includes encrypted key pairs $205_{2-3}$.

Encrypted key pairs $205_{4-6}$ are future keys 220 because the key pairs are not within active window 215 but have not yet been designated as an active key (by the key publisher). Encrypted key pair $205_1$ is a past key that falls outside active window 215, precedes the current active key pair, and thus is a deprecated key pair 210. If the key consumer receives a secure message envelope that is encrypted using a future key 220, the key consumer designates the future key 220 as the current active key and advances the window, as appropriate. Using the given windowing example in FIG. 2, if the key consumer receives a secure message with a corresponding encrypted key pair $205_5$, the key consumer decrypts the message and also marks encrypted key pair $205_5$ as the active key. In addition, the key consumer moves active window 215 so that the key pairs in the window are encrypted key pairs $205_{4-5}$.

On the other hand, in one embodiment, if the key consumer receives a secure message envelope from a client that uses a deprecated key pair outside active window 215 but still in list 200, the key consumer may choose to not decrypt the message and may flag a failure to the client that sent the message. However, if the deprecated key pair is no longer in list 200, the key consumer is unable to decrypt the message. Using the given windowing example in FIG. 2, if the client sends to the key consumer an encrypted message using a key corresponding to encrypted key pair $205_1$, the key consumer uses list 200 to identify encrypted key pair $205_1$ as an older key outside of active window 215. Because encrypted key pair $205_1$ corresponds to a deprecated key 210, the key consumer may choose not to decrypt the message. In one embodiment, an administrator may set alerts to capture attempts at sending messages using key versions outside active window 215 (e.g., deprecated keys 210, key versions in future keys 220, keys not within list 200, etc.).

Active window 215 enables the rotation of older keys and prevents error spiking on the client-side. This allows older keys and the newer keys to exist in rotation, eliminating the need for system downtime to rotate the keys. In addition, accepting an amount of keys preceding the active key pair allows handling slower clients that may have downloaded a public key from the public key distributor in the past but only sent the message shortly after a new active key had been assigned.

Figure 3:
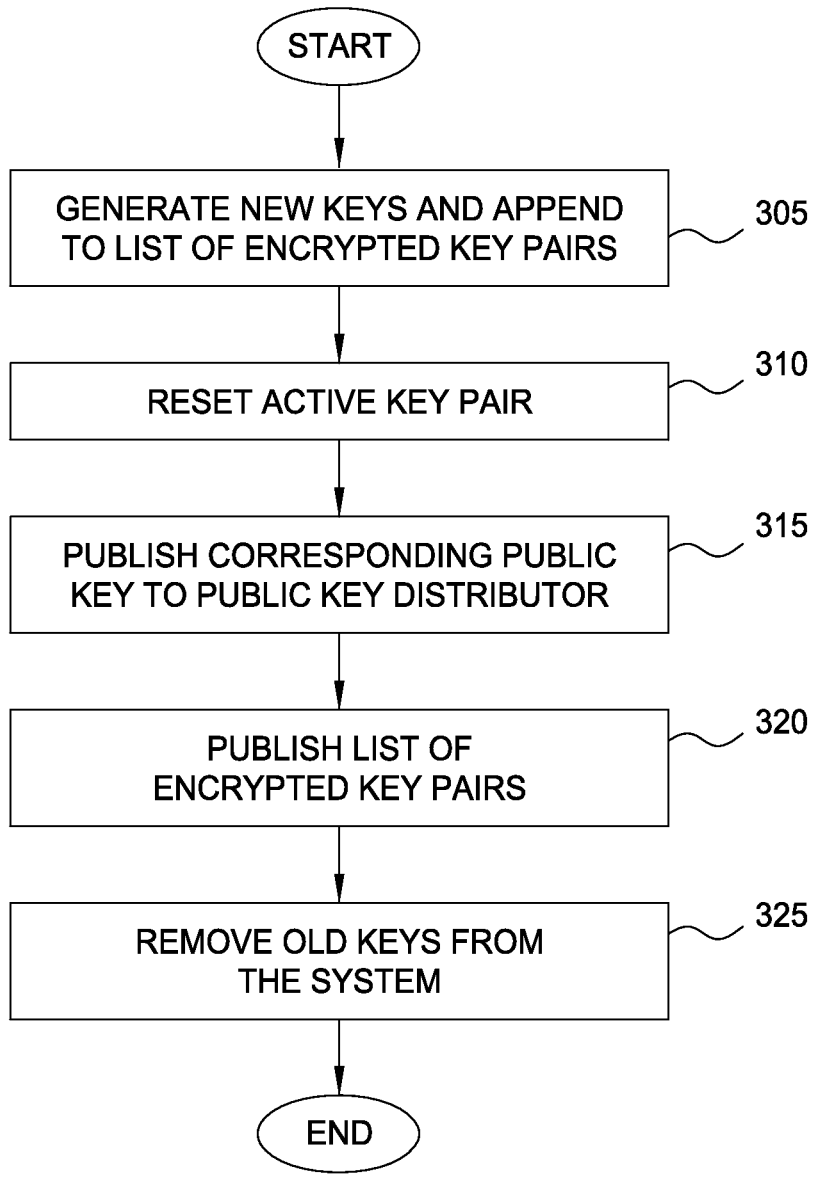
FIG. 3 illustrates a method for managing encrypted key pairs in an example computing environment, according to one embodiment.

FIG. 3 illustrates a method 300 for managing encrypted key pairs in a distributed environment, according to one embodiment. The key publisher in the high security environment performs these steps at a specified interval. Assume for this discussion that the key publisher has an encrypted key pair list and a designated active key pair.

Method 300 begins at step 305, where the key publisher generates new encryption keys. The key publisher appends the new keys to the encrypted key pair list. At step 310, the key publisher designates a new active key pair to be the encrypted key pair succeeding the current active key pair in the list. For instance, referring to the example list 200 of FIG. 2, if the current key pair is encrypted key pair $205_3$, the key publisher designates encrypted key pair $205_4$ as the new active key pair.

At step 315, the key publisher publishes the public key corresponding to the designated active key pair to the public key distributor. The public key distributor issues the public key to clients that communicate sensitive data to and from the key consumers of the high security environment. At step 320, the key publisher issues the list of encrypted key pairs to the key escrow. In turn, the key escrow distributes the list to key consumers in the high security environment of the computing infrastructure. Subsequently, clients having the active key can send secure messages encrypted with the key to the key consumers that can decrypt the messages by referencing the list of encrypted key pairs generated by the key publisher.

At step 325, the key publisher deprecates and purges the old keys from the system. Completely removing older keys from the system helps provide forward secrecy. That is, even if potential attackers somehow acquire the current keys to access sensitive data, the compromise is limited to the current key and not the information exchanged using the older keys.

Figure 4:
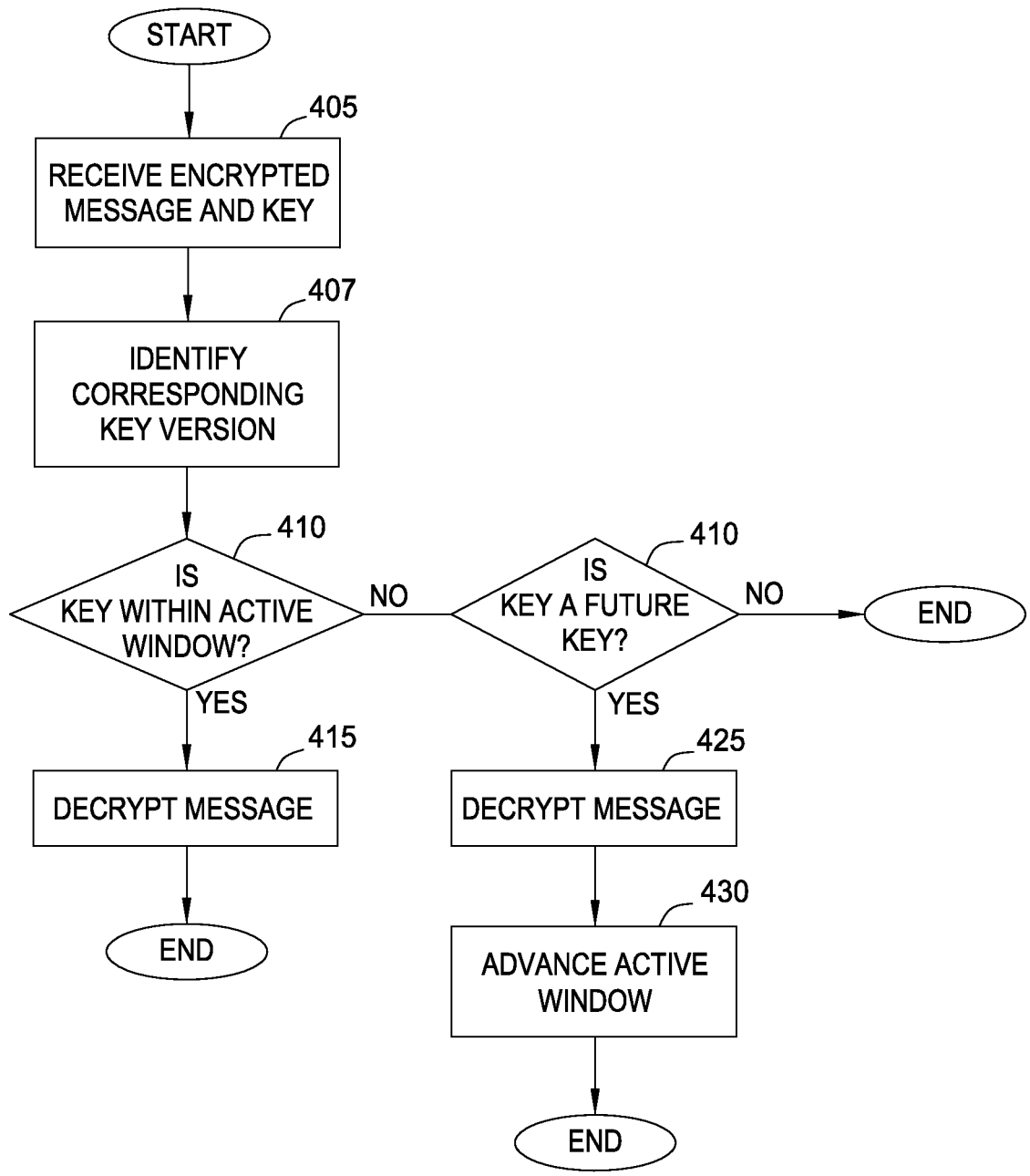
FIG. 4 illustrates a method for decrypting messages with keys using a sliding window in an example computing environment, according to one embodiment.

FIG. 4 illustrates a method 400 for decrypting messages with keys using a sliding active window in the example computing environment, according to one embodiment. Assume that a key consumer in the high security environment has already downloaded a list of encrypted key pairs from the key escrow. As shown, method 400 begins at step 405, where the key consumer receives an encrypted message containing metadata about the key. For example, the encrypted message may contain credit card information to be processed by a key consumer billing application. Further, the encrypted message may include metadata about the key, such as the version of the key. At step 407, the key consumer identifies the corresponding key version based on the provided metadata. At step 410, the key consumer determines whether the key is within the active window. As stated, the active window of the key consumer includes the keys from the current key and a specified number of previous keys. If the key is within the active window, then the key consumer decrypts the message (at step 415).

However, if the key is outside the active window, the key consumer determines whether the key is either a past key or a future key. Receiving a future key may be a result of the asynchronous nature of the key publisher broadcasting active key data to multiple key consumers. For example, a key consumer may fall out of sync with the other key consumers and lag behind by a few seconds. At any rate, the key consumer searches the list of key pairs received by the key escrow. If the key consumer identifies the given key as a future key, then the key consumer decrypts the message (at step 425) and advances the active window (at step 430). However, if the key consumers the given key as a past key outside the active window, then the key consumer flags a failure. In one embodiment, the key consumer may be configured to generate an alert upon receiving deprecated keys or invalid messages that do not decrypt.

Figure 5:
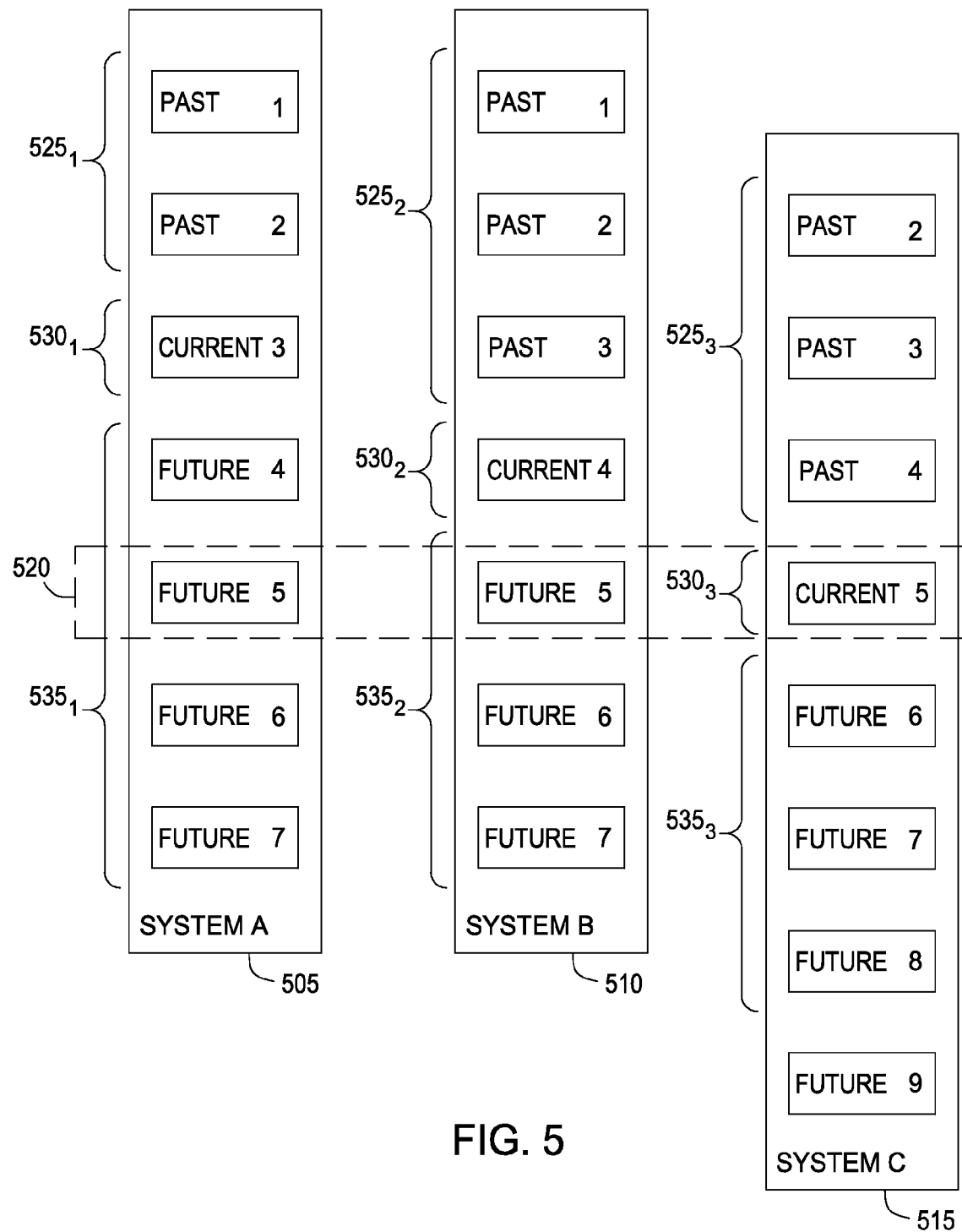
FIG. 5 illustrates a use case for managing encrypted key pairs in a computing environment having multiple key consumer subsystems, according to one embodiment.

FIG. 5 illustrates an example specific-use case 500 for managing encrypted key pairs in a distributed computing infrastructure that includes three subsystems, according to one embodiment. Key windowing allows secure communication between multiple subsystems under loose synchronization because of latency, brief subsystem outages, or other reasons. In the example specific-use case 500, three different key consumer systems A 505, B 510, and C 515 maintain a loosely synchronized view of the current key window. For example, the three subsystems may correspond to systems located in different geographic locations (e.g., the systems may correspond to credit card database applications in different countries).

As shown by each system having a different current key $530_{1-3}$, the subsystems may fall out of sync with each other for whatever reason, such as if a link between the systems goes offline or if one of the systems loses power and subsequently reboots after a time period. However, as long as the current key of a particular subsystem remains in the windows of the other subsystems, the particular subsystem may communicate securely with the other subsystems.

In the given example, systems A 505, B 510, and C 515 might be using different keys to decrypt and access data in a secure message. Regardless, the embodiments help ascertain that the systems function reliably. For example, system C 515 has the most up-to-date information of the three subsystems, having a current active key $530_3$ corresponding to key 5, whereas system A 505 has a current active key $530_1$ of 3 and system B 510 has a current active key $530_2$ of 4. Eventually, system A 505 or B 510 may receive a secure message from a client device with key information corresponding to encrypted key pair 5. Despite encrypted key pair 5 not being the current active key pair from the perspectives of system A or B, both systems can rely on the key pair list to both be able to decrypt the message and recover to the more recent active key pair.

Figure 6:
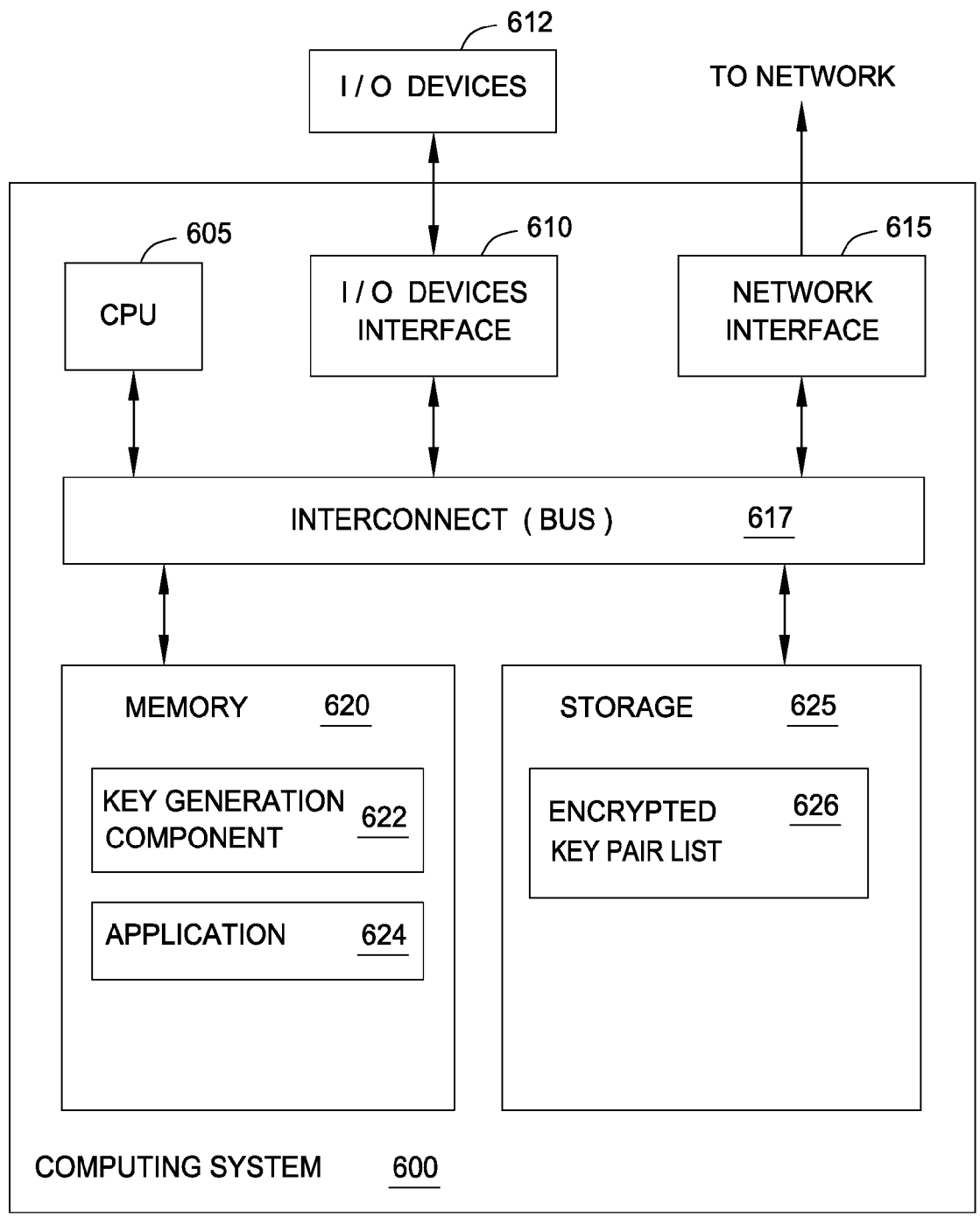
FIG. 6 illustrates a computing system configured to manage encrypted key pairs in an example computing environment, according to one embodiment.

FIG. 6 illustrates a computing system 600 configured to generate and manage key pairs within the example computing environment, according to one embodiment. As shown, the computing system 600 includes, without limitation, a central processing unit (CPU) 605, a network interface 615, a memory 620, a storage 625, each connected to a bus 617. Computing system 600 may also include an I/O device interface 610 connecting I/O devices 612 (e.g., keyboard, display, and mouse devices) to the computing system 600. Further, in context of this disclosure, the computing elements shown in computing system 600 may correspond to a physical computing system (e.g., a system in a data center) or may be a virtual computing instance executing within a computing cloud.

CPU 605 retrieves and executes programming instructions stored in memory 520 as well as stores and retrieves application data residing in memory 620. Interconnect 617 is used to transmit programming instructions and application data between CPU 605, I/O devices interface 610, storage 625, network interface 615, and memory 620. Note, CPU 605 is included to be representative of a single CPU, multiple CPUs, a single CPU having multiple processing cores, and the like. And memory 620 is generally included to be representative of a random access memory. Storage 625 may be a disk drive storage device. Although shown as a single unit, storage 625 may be a combination of fixed and/or removable storage devices, such as fixed disc drives, removable memory cards, or optical storage, network attached storage (NAS), or a storage-area network (SAN).

Illustratively, memory 620 includes a key generation component 622 and an application 624. And storage 625 includes an encrypted key pair list 626. Key generation component 622 is responsible for generating new keys to be stored in encrypted key pair list 626. Further, application 624 publishes encrypted key pair list 626 to other components in the computing infrastructure, such as the key escrow and the public key distributor. Additionally, application 624 deprecates and purges expired keys from encrypted key pair list 626.

Figure 7:
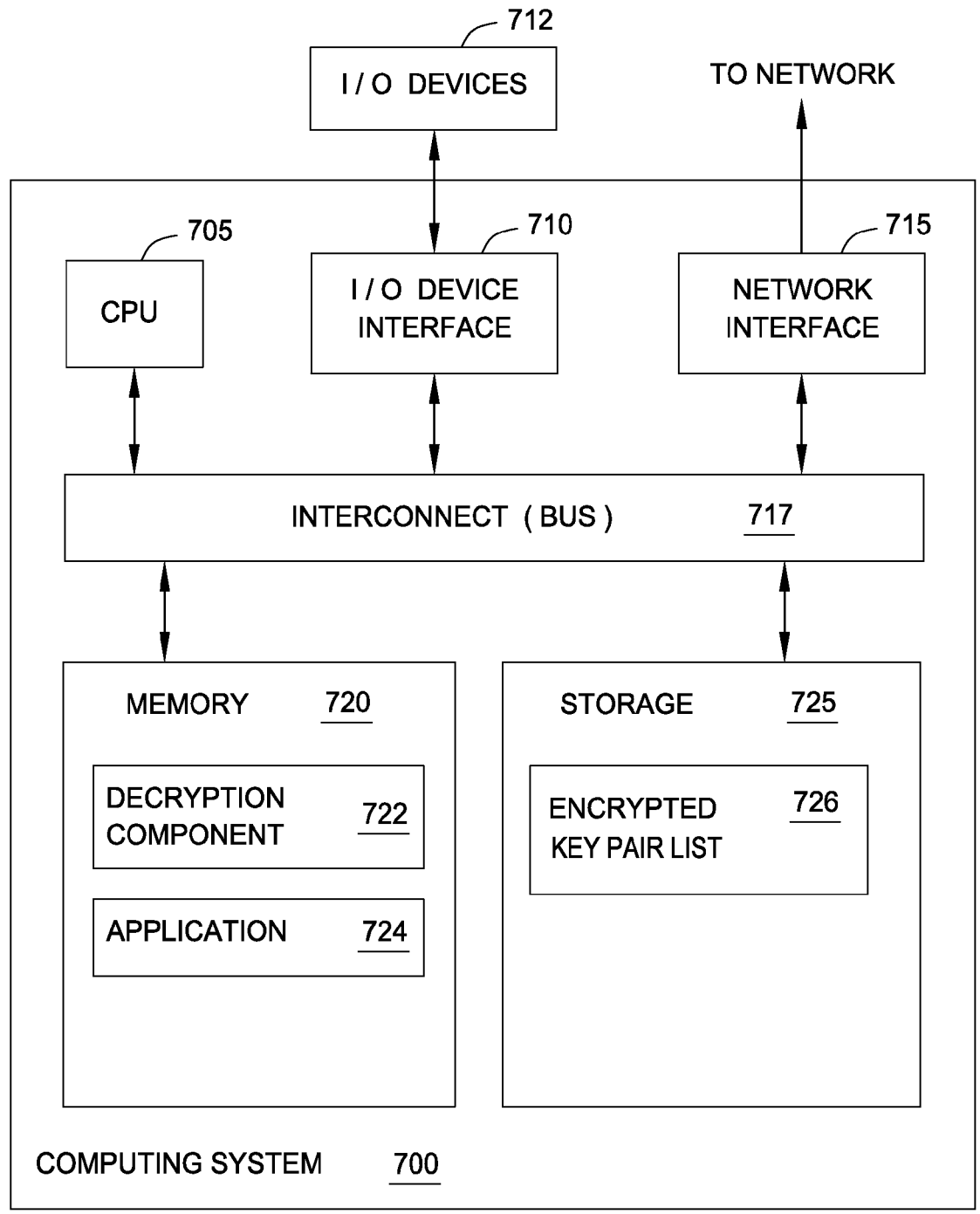
FIG. 7 illustrates a computing system configured to maintain an active window of keys, according to one embodiment.

FIG. 7 illustrates a computing system 700 configured to decrypt secure data using distributed encrypted key pair information within the example computing environment, according to one embodiment. As shown, the computing system 700 includes, without limitation, a central processing unit (CPU) 705, a network interface 715, a memory 720, a storage 725, each connected to a bus 717. Computing system 700 may also include an I/O device interface 710 connecting I/O devices 712 (e.g., keyboard, display, and mouse devices) to the computing system 700. Further, in context of this disclosure, the computing elements shown in computing system 700 may correspond to a physical computing system (e.g., a system in a data center) or may be a virtual computing instance executing within a computing cloud.

CPU 705 retrieves and executes programming instructions stored in memory 720 as well as stores and retrieves application data residing in memory 720. Interconnect 717 is used to transmit programming instructions and application data between CPU 705, I/O devices interface 710, storage 725, network interface 715, and memory 720. Note, CPU 705 is included to be representative of a single CPU, multiple CPUs, a single CPU having multiple processing cores, and the like. And memory 720 is generally included to be representative of a random access memory. Storage 725 may be a disk drive storage device. Although shown as a single unit, storage 725 may be a combination of fixed and/or removable storage devices, such as fixed disc drives, removable memory cards, or optical storage, network attached storage (NAS), or a storage-area network (SAN).

Illustratively, memory 720 includes a decryption component 722 and an application 724. And storage 725 includes an encrypted key pair list 726. Application 724 manages the key pair windowing of encrypted key pair list 726. Upon receiving a secure message from a client device (e.g., through a browser application on the device), application 724 identifies the encrypted key pair corresponding to the decryption key described in the metadata envelope of the secure message. Decryption component 722 is responsible for decrypting the secure message sent by the client.

While the foregoing is directed to embodiments of the present disclosure, other and further embodiments of the disclosure may be devised without departing from the basic scope thereof. For example, aspects of the present disclosure may be implemented in hardware, software, or a combination of hardware and software. One embodiment of the disclosure may be implemented as a program product for use with a computer system. The program(s) of the program product define functions of the embodiments (including the methods described herein) and can be contained on a variety of computer-readable storage media. Illustrative non-transitory computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., a hard-disk drive or any type of solid-state random-access semiconductor memory) on which alterable information is stored. Such computer-readable storage media, when carrying computer-readable instructions that direct the functions of the present disclosure, are embodiments of the present disclosure.

Although certain embodiments may achieve advantages over other possible solutions and/or over the prior art, whether a particular advantage is achieved by a given embodiment is not limiting. Thus, the following aspects, features, embodiments and advantages are merely illustrative and are not considered elements or limitations of the appended claims except where explicitly recited in a claim(s).

Aspects of the present disclosure may be embodied as a system, method or computer program product. Accordingly, embodiments presented herein may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible or otherwise non-transitory medium that can contain, or store a program for use by or in connection with an instruction execution system, apparatus or device.

The flowchart and block diagrams in the Figures illustrate the architecture, functionality, and operation of possible implementations of systems, methods, and computer program products according to various embodiments presented herein. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments disclosed herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet.

Advantageously, the embodiments enable enterprises operating in a cloud computing environment to significantly reduce the scope of the high security infrastructure while still being able to retain the agility and flexibility afforded by the cloud environment. By automating the key rotation process, the need for manual intervention (e.g., by requiring system downtimes to rotate encryption keys) is reduced significantly (or otherwise non-existent). Further, the system disclosed by the embodiments is resilient and highly available, so even if one of the components goes offline for whatever reason, the system can remain operational because the other running components in the infrastructure have the data (e.g., key pair lists, information about the active key pairs, etc.) to manage and process key pairs. An administrator can adjust the resiliency of the system by increasing the size of the encrypted key pair list. The sliding window approach also helps to minimize data compromise and provide forward secrecy. That is, because the key publisher deprecates and purges old keys from the system, an attacker that acquires the old public keys is unable to use the keys in decrypting secure messages. Additionally, the amount of data loss in event of a compromise is proportional to the interval at which the key publisher updates the list, so a smaller interval may result in the system being subject to less data compromise. And adjusting the size of the active window allows the computing infrastructure to scale up or down and tighten or loosen synchronization between systems based on the desired requirements.

In view of the foregoing, the scope of the present disclosure is determined by the claims that follow.

What is claimed is:

1. A computer-implemented method for managing encrypted key pairs, the method comprising:
   generating a set of encrypted key pairs;
   designating, from the set of encrypted key pairs, a first encrypted key pair as a currently active key pair;
   designating a time-based window having a size and indicating a number of key pairs that are valid for transactions;
   publishing a public key corresponding to the currently active key pair to a key distributor; and
   publishing the set of encrypted key pairs to a key escrow.

2. The method of claim 1, wherein the key distributor issues a public key associated with the currently active key pair to one or more client computers.

3. The method of claim 2, wherein a key consumer application downloads the list from the key escrow, and wherein the key consumer application decrypts messages encrypted using a key associated with one of the number of key pairs within the window.

4. The method of claim 3, wherein the client computers send messages encrypted using the public key to the key consumer application.

5. The method of claim 1, further comprising:
   designating a second encrypted key pair in the set of encrypted key pairs as the currently active key pair;
   publishing the public key corresponding to the designated currently active key pair to the key distributor; and
   advancing the window forward to the currently active key pair.

6. A computer-implemented method for managing encrypted data, the method comprising:
   receiving an encrypted message having metadata corresponding to a public key;
   identifying a first key pair corresponding to the public key in a set of key pairs, wherein a second key pair in the set is a currently active key pair, wherein the set of key pairs includes a time-based window having a size and indicating a number of key pairs that are valid for transactions, and wherein one of the number of key pairs is the currently active key; and
   upon determining that the identified first key pair is within the window:
      accessing a decryption key from the identified first key pair, and decrypting the message.

7. The method of claim 6, further comprising, upon determining that the identified first key pair is outside the window and is sequentially after the window:
   accessing the decryption key from the identified first key pair;
   decrypting the message;
   designating the identified first key pair as the currently active key pair; and
   advancing the window forward to the currently active key pair.

8. The method of claim 6, further comprising, upon determining that the identified first key pair is outside the window and is sequentially preceding the window, aborting the transaction.

9. The method of claim 6, wherein the key pairs in the list are encrypted.

10. A non-transitory computer-readable storage medium storing instructions, which, when executed on a processor, performs an operation for managing encrypted key pairs, the operation comprising:
    generating a set of encrypted key pairs;
    designating, from the set of encrypted key pairs, a first encrypted key pair as a currently active key pair;
    designating a time-based window having a size and indicating a number of key pairs that are valid for transactions;
    publishing a public key corresponding to the currently active key pair to a key distributor; and
    publishing the set of encrypted key pairs to a key escrow.

11. The non-transitory computer-readable storage medium of claim 10, wherein the key distributor issues a public key associated with the currently active key pair to one or more client computers.

12. The non-transitory computer-readable storage medium of claim 11, wherein a key consumer application downloads the list from the key escrow, and wherein the key consumer application decrypts messages encrypted using a key associated with one of the number of key pairs within the window.

13. The non-transitory computer-readable storage medium of claim 12, wherein the client computers send messages encrypted using the public key to the key consumer application.

14. The non-transitory computer readable storage medium of claim 10, wherein the operation further comprises:
    designating a second encrypted key pair in the set of encrypted key pairs as the currently active key pair;
    publishing the public key corresponding to the designated currently active key pair to the key distributor; and advancing the window forward to the currently active key pair.

15. A non-transitory computer-readable storage medium storing instructions, which, when executed on a processor, performs an operation for managing encrypted data, the operation comprising:

receiving an encrypted message having metadata corresponding to a public key;

identifying a first key pair corresponding to the public key in a set of key pairs, wherein a second key pair in the set is a currently active key pair, wherein the set of key pairs includes a time-based window having a size and indicating a number of key pairs that are valid for transactions, and wherein one of the number of key pairs is the currently active key; and upon determining that the identified first key pair is within the window:

accessing a decryption key from the identified first key pair, and decrypting the message.

16. The non-transitory computer-readable storage medium of claim 15, wherein the operation further comprises, upon determining that the identified first key pair is outside the window and is sequentially after the window:

accessing the decryption key from the identified first key pair;

decrypting the message;

designating the identified first key pair as the currently active key pair; and advancing the window forward to the currently active key pair.

17. The non-transitory computer-readable storage medium of claim 15, wherein the operation further comprises, upon determining that the identified first key pair is outside the window and is sequentially preceding the window, aborting the transaction.

18. The non-transitory computer-readable storage medium of claim 15, wherein the key pairs in the list are encrypted.

19. A system, comprising:

a processor; and a memory hosting an application, which, when executed on the processor, performs an operation for managing encrypted key pairs, the operation comprising:

generating a set of encrypted key pairs;

designating, from the set of encrypted key pairs, a first encrypted key pair as a currently active key pair;

designating a time-based window having a size and indicating a number of key pairs that are valid for transactions;

publishing a public key corresponding to the currently active key pair to a key distributor; and publishing, at the specified interval, the set of encrypted key pairs to a key escrow.

20. The system of claim 19, wherein the operation further comprises:

designating a second encrypted key pair in the set of encrypted key pairs as the currently active key pair;

publishing the public key corresponding to the designated currently active key pair to the key distributor; and advancing the window forward to the currently active key pair.

\* \* \* \* \*

UNITED STATES PATENT AND TRADEMARK OFFICE
CERTIFICATE OF CORRECTION

| | |
|---|---|
| PATENT NO. | : 9,094,377 B2 |
| APPLICATION NO. | : 13/969365 |
| DATED | : July 28, 2015 |
| INVENTOR(S) | : Poornaprajna Udupi, Jason Chan and Jay Zarfoss |

It is certified that error appears in the above-identified patent and that said Letters Patent is hereby corrected as shown below:

Title Page

Item (57) Abstract

Line 8, please delete "can".

Signed and Sealed this
Twenty-first Day of June, 2016

Michelle K. Lee
*Director of the United States Patent and Trademark Office*